(12) United States Patent
Williams et al.

(10) Patent No.: US 7,631,261 B2
(45) Date of Patent: Dec. 8, 2009

(54) EFFICIENT METHOD FOR CREATING A VISUAL TELEPRESENCE FOR LARGE NUMBERS OF SIMULTANEOUS USERS

(75) Inventors: Thomas D. Williams, Shutesbury, MA (US); Alfred A. Hough, Northampton, MA (US)

(73) Assignee: Inoue Technologies, LLC, Northhampton, MA (US)

( * ) Notice: Subject to any disclaimer, the term of this patent is extended or adjusted under 35 U.S.C. 154(b) by 690 days.

(21) Appl. No.: 10/660,747

(22) Filed: Sep. 12, 2003

(65) Prior Publication Data
US 2004/0169676 A1    Sep. 2, 2004

Related U.S. Application Data

(60) Provisional application No. 60/410,335, filed on Sep. 12, 2002.

(51) Int. Cl.
*G06F 3/00* (2006.01)
*G06F 3/01* (2006.01)

(52) U.S. Cl. .................. 715/720; 715/716; 715/719; 715/782; 715/850; 348/14.01; 348/14.04; 348/14.06; 345/427; 345/581; 345/594

(58) Field of Classification Search .............. 715/757, 715/719–723, 716, 781–782, 850; 348/14.01, 348/14.04, 14.06; 345/427, 581, 594
See application file for complete search history.

(56) References Cited

U.S. PATENT DOCUMENTS

| | | | | |
|---|---|---|---|---|
| 5,259,040 A | * | 11/1993 | Hanna | 382/107 |
| 5,649,032 A | * | 7/1997 | Burt et al. | 382/284 |
| 5,684,935 A | * | 11/1997 | Demesa et al. | 345/419 |
| 5,850,352 A | * | 12/1998 | Moezzi et al. | 345/419 |
| 6,219,444 B1 | | 4/2001 | Shashua et al. | |
| 6,353,678 B1 | * | 3/2002 | Guo et al. | 382/154 |
| 6,522,325 B1 | * | 2/2003 | Sorokin et al. | 345/427 |
| 6,667,748 B1 | * | 12/2003 | Hubbe et al. | 715/723 |
| 6,711,379 B1 | * | 3/2004 | Owa et al. | 455/3.01 |
| 6,753,899 B2 | * | 6/2004 | Lapalme et al. | 348/14.01 |
| 7,152,210 B1 | * | 12/2006 | Van Den Hoven et al. | 715/723 |
| 7,277,118 B2 | * | 10/2007 | Foote | 348/36 |
| 2003/0231179 A1 | * | 12/2003 | Suzuki | 345/423 |
| 2004/0096119 A1 | | 5/2004 | Williams et al. | |

(Continued)

OTHER PUBLICATIONS

Kanade, Takeo et al., Virtualized Reality: Constructing Virtual Worlds from Real Scenes, Jan.-Mar. 1997, IEEE MultiMedia, 34-46.*

(Continued)

*Primary Examiner*—Steven B Theriault
*Assistant Examiner*—Nicholas Augustine
(74) *Attorney, Agent, or Firm*—Dickstein Shapiro LLP (57) ABSTRACT

A method for creating visual telepresence for a large number of simultaneous users includes the step of simultaneously and continuously processing sets of images from a plurality of cameras to produce sets of short visual sequences that provide for virtual short movements in the environment. Additional steps include routing these many simultaneous repetitive short sequences to a plurality of user service processes. These short sequences are then composed into continuous video streams that provide convincing visual display of telepresence to many simultaneous users.

21 Claims, 6 Drawing Sheets

U.S. PATENT DOCUMENTS

2004/0119435 A1* 6/2004 Pinney ............... 318/568.12
2007/0026852 A1* 2/2007 Logan et al. ............ 455/422.1

OTHER PUBLICATIONS

Shashua, A. et al., "Trilinearity of Perspective Views and its Associated Tensor," Institute of Computer Science, Jun. 1995, Hebrew University of Jerusalem.

Avidan, S. et al, "Novel View Synthesis by Cascading Trilinear Tensors," IEEE Transactions on Visualization and Computer Graphics, vol. 4, No. 4, pp. 293-306, Oct.-Dec. 1998.

Faugeras, O. et al, "What can two images tell us about a third one?", INRIA, Programme 4—Robotique, image et vision, Projet Robotvis, pp. 1-23, Jul. 1993, Sophia Antipolis, France.

Barrett, E.B. et al., "Some Invariant Linear Methods in Photogrammetry and Model-Matching," IEEE, O-8186-2855, pp. 122-128, Mar. 1992.

* cited by examiner

Figure 1. Steps

Figure 2 Camera Configuration Diagram

Figure 3. Summary of Preferred Embodiment

Figure 4. Diagram of Preferred Embodiment for Repetitive Short Sequence

Figure 5. Diagram of Preferred Embodiment for Routing Device

Figure 6. Diagram of Preferred Embodiment for User Service Device

EFFICIENT METHOD FOR CREATING A VISUAL TELEPRESENCE FOR LARGE NUMBERS OF SIMULTANEOUS USERS This nonprovisional application claims the benefit of U.S. Provisional Application No. 60/410,335, filed Sep. 12, 2002.

FIELD OF INVENTION

The present invention generally relates to the field of imagery in multimedia, video (including interactive, immersive, Internet and networked streaming video), virtual reality, telepresence and television. More particularly, the present invention relates to a method for delivering continuous multiple visual telepresences to a large number of simultaneous users in real time.

BACKGROUND OF INVENTION

It is clearly impractical to have many (perhaps tens of thousands) of cameras moving through a scene where each camera is physically controlled by an individual user to create a unique user-preferred view. Alternatively, a set of fixed cameras are placed in the environment and user-preferred views that move through the environment could be synthesized. Although computer systems of this era are powerful, the need to service so many users with unique viewpoint control is a very demanding requirement.

SUMMARY OF INVENTION

The present invention concerns the effective delivery of a visual virtual reality or a visual telepresence experience to many simultaneous users who are viewing an actual scene in real-time. Delivery of one or more of these views is accomplished with varying degrees of viewer control, as desired, depending on the application. The number of simultaneous users may range from a few people, to thousands or in the tens of thousands.

Figure 1:
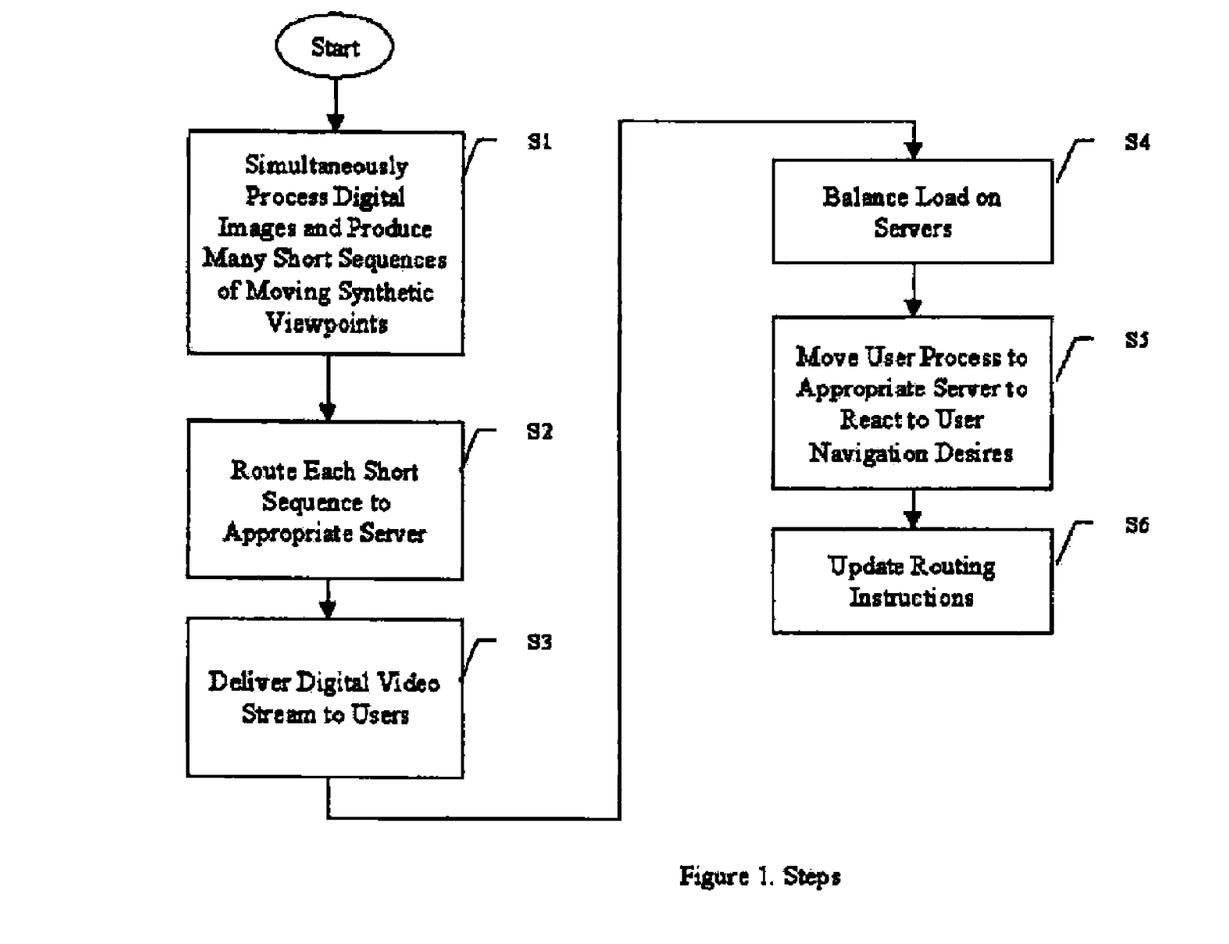
FIG. 1 is a flow chart illustrating a method in accordance with an embodiment disclosed herein.

By way of overview, a plurality of fixed cameras are placed in the subject environment to be viewed, and virtual moving images are synthesized in accordance with the method of the present invention, to create unique visual telepresences. Referring now to FIG. 1, wherein like reference numerals indicate like elements, the method comprises several steps. It is to be noted that in an ongoing process, all of these steps occur continuously and simultaneously. They are described here in a linear fashion for clarity.

In a preferred embodiment, the method for efficiently delivering one or more visual virtual realities to a plurality of simultaneous users comprises the steps of:

(a) capturing as image data a plurality of images from two or more electronic cameras in two or more different locations, respectively, and processing the image data from each sequential instant of the time series (such as, but not limited to frames of video) to produce a short sequence of data representing a synthetic (possibly moving) viewpoint as in step S1. Viewpoint motions contained in each short sequence are repeated; and (b) routing each short sequence data, as in step S2, to one or more user service processes;

(c) composing each short sequence data into a continuous digital video stream; and delivering the video stream for continuous display and viewing as in step S3; and (d) balancing the processing load on user server computers as in step S4; and (e) reacting to user navigation requests and moving user processes to appropriate servers as in step S5; and (f) updating routing instructions as in step S6.

The user viewing the video stream on a display screen sees a real-time viewer-centered moving image, for instance, as though the user was walking on a sidewalk in an actual town. The display presentation is real, in that all events that exist at the time of viewing are occurring substantially instantaneously, much as a high-speed web camera or television system displays remote actual events, for example.

Unlike a web camera or television system, the viewpoint displayed in the present invention moves in tandem with user movement. For example, if the application simulates a walking motion, the viewpoint displayed moves as though the viewer is walking. This is not the view from any existing camera.

In addition, the viewer is capable of changing the viewpoint's path as desired. For instance, a security application of the present invention may require the capability of cameras to move quickly, pan, and zoom and then to dwell, and then jump quickly to a distant viewpoint, whereas a shopping or tourist application would likely require less involved motion type attributes, such as moving slowly and continuously and/or dwelling.

Users may be electronically connected, locally or globally via a communications network, to navigate through the event to facilitate real-time viewing. This is facilitated by the use of multiple server computers each providing service to some number of users.

With these and other advantages and features of the invention that may become hereinafter apparent, the nature of the invention may be more clearly understood by reference to the following detailed description of the invention, the appended claims and to the several drawings attached herein.

NOMENCLATURE

The following terms, in alphabetical order, is presented for easier understanding of the detailed description of the present invention.

Continuous Video Stream

Digital video data that does not stop unless the viewer decides to terminate.

Events

Happenings, happenstances, interesting visual on-goings.

Image (A Digital Image)

A regular array of point values, usually representing brightness and color values as samples of a picture. Sometimes an image is an array of values, still registered with the image frame, but representing quantities other than brightness or color, such as correspondences or image differences. An image may be one of a sequence, such as the digital representation of a fame of video.

Junctions

Places in the environment where short sequence paths begin and end.

Novel Viewpoint

See "Synthetic Viewpoint".

Predetermined Short Sequence, or "SS".

A set of viewpoints, determined in advance, that starts at a junction, moves in a regular fashion to form a short path, and ends at a junction.

Short Sequence Digital Video Data

The data that contains the digital video of a short sequence.

Stationary View

A single viewpoint.

Synthetic Viewpoint Image

An image generated as though it were formed from a camera placed at a synthetic viewpoint.

Synthetic viewpoint (also Called a "Novel Viewpoint")

A camera position (or viewpoint) that is not the position of an actual camera.

Unmoving Sequence

A sequence produced from a stationary viewpoint

User Service Process

A computer program or group of programs that serve users.

View

Same as Viewpoint

Viewpoint

A position, describable with 6 parameters (three translational and three rotational) where a camera or eye would be in order to view a scene.

Viewpoint Motion

The motion of a viewpoint. Strictly speaking, viewpoints do not move, but are sequentially selected, as though they were moving.

Virtual Motion

The convincing reality of being somewhere (that one is not) based on the images being displayed that are the same as one would see if one were present in the scene and moving.

Virtual Moving Images

The images displayed during virtual motion.

DETAILED DESCRIPTION OF PREFERRED EMBODIMENTS

The present invention is directed to a method for effectively delivering visual telepresence to a plurality of simultaneous users. The method of the present invention involves the efficient processing and delivery of image data in a unique way. More specifically, the processing begins by capturing ongoing electronic images from a plurality of cameras distributed throughout an environment in many fixed locations.

Within the scene, a set of paths is defined, along with junctions, much like a road network. The direct paths between each pair of junctions are called "short paths" and are predetermined. Each short path is then divided into a sequence of viewpoints. If one were to sequentially capture images from the sequence of viewpoints along a short path, they would appear as though one were walking along this short path, for instance, down the sidewalk in a town. Because it is impossible to place cameras at every viewpoint, a smaller number of cameras are placed in fixed positions in the scene, nearby short path junctions. Computer processing techniques use images from these actual cameras to synthesize images as though they were produced from the viewpoints along the short paths.

Much like travelers may traverse long paths through the road network by selecting different roads at junctions, long paths may be constructed through the scene composed of short paths by selecting appropriate short paths at junctions. In the present invention, this process of short path selection takes place without the knowledge of the user. Instead, the user simply decides which direction to proceed, stop, rotate, etc.

A separate computer processing device repetitively produces the sequence of images from synthetic viewpoints along the short path, and many such devices are simultaneously doing so in synchrony.

By connecting the predetermined short path sequences together, a continuous virtual path through the scene is provided to each user or viewer. Each viewer is served by a computer process that composes the digital video stream appropriate to that user's ongoing view. The viewer may decide to change virtual motion, and therefore would require a change in short path sequence. A means is provided in the present invention that routes the digital video stream from each ongoing short sequence virtual view device to the process that serves that viewer. This routing is performed by a routing or switching device as is common in computer networking. Other computer devices and processes oversee the routing so as to balance the load among the user (viewer) processors and the delivery of the correct short path digital video the correct process.

Figure 3:
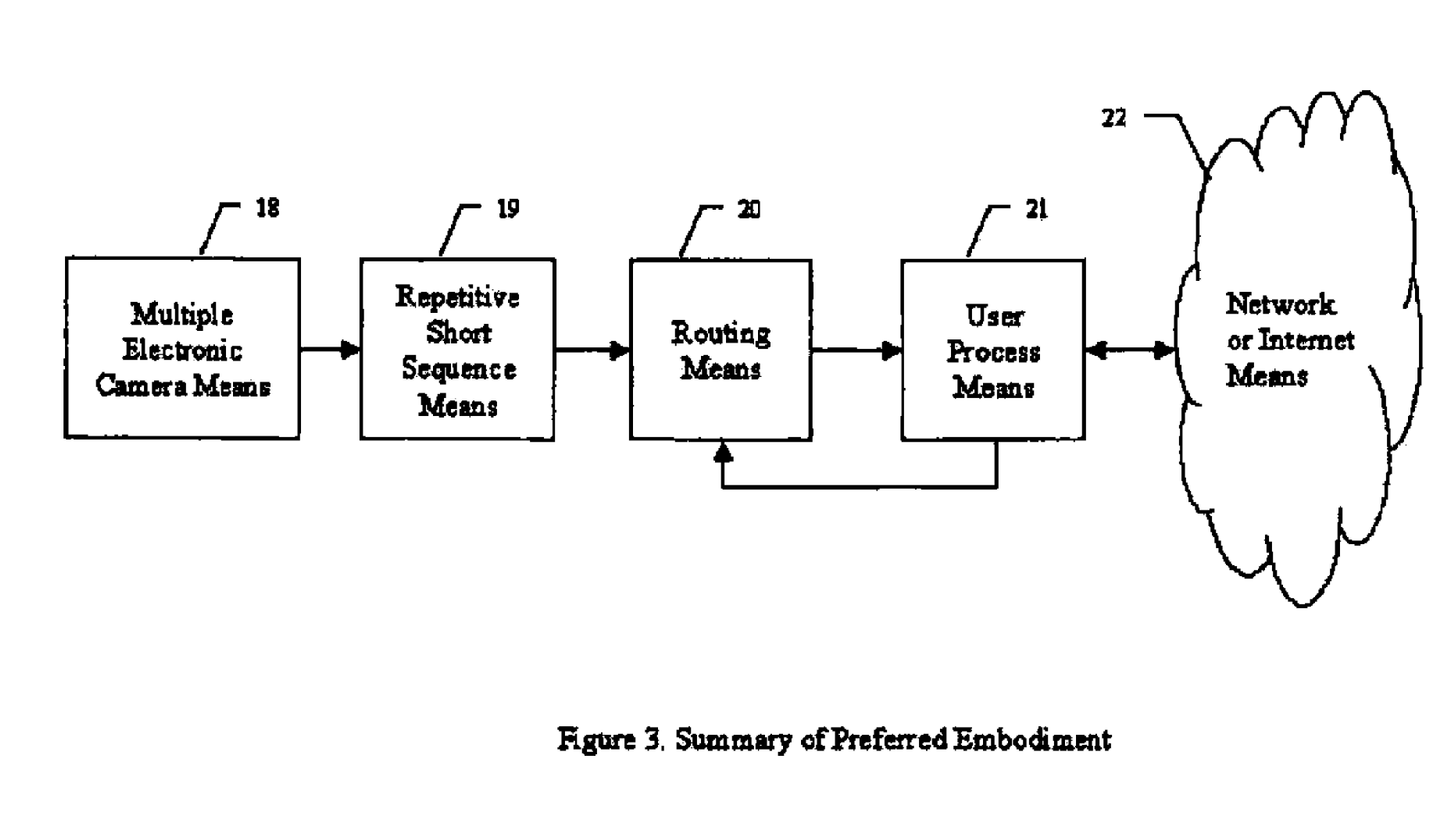
FIG. 3 is a block diagram of exemplary devices useful in the delivery of images to a plurality of simultaneous users, in accordance with a preferred embodiment of the present invention.

Referring now to the figures, wherein like reference numerals indicate like elements, in FIG. 3 there is shown a block diagram of exemplary devices, which substantial connection is useful in the efficient delivery of images to a plurality of simultaneous users, in accordance with a preferred embodiment of the present invention.

For example, a plurality of electronic imaging devices, such as video or digital cameras (hereinafter referred to as "cameras"), are positioned so that a moving or stationary scene is captured. Two or more images of the scene are of appropriate resolution and view for a desired application. Preferably, each camera is capable of providing a continuous stream of images, as in a video.

Although there is no specific requirement to orient the cameras in a precise manner, there is a minimum requirement that the cameras are oriented such that at least pairs of cameras have view angles that are substantially similar and provide desired viewing coverage.

It is also possible for the camera arrangement to be less carefully placed or randomly placed, where sufficient quantity of overlapping views with sufficient parallax exists to produce short sequences that are joined to form useful paths. Random or nearly random placements of the cameras may be necessary for military or law enforcement applications, or where rapid placement, stealth or covert camera placement is advantageous.

Figure 2:
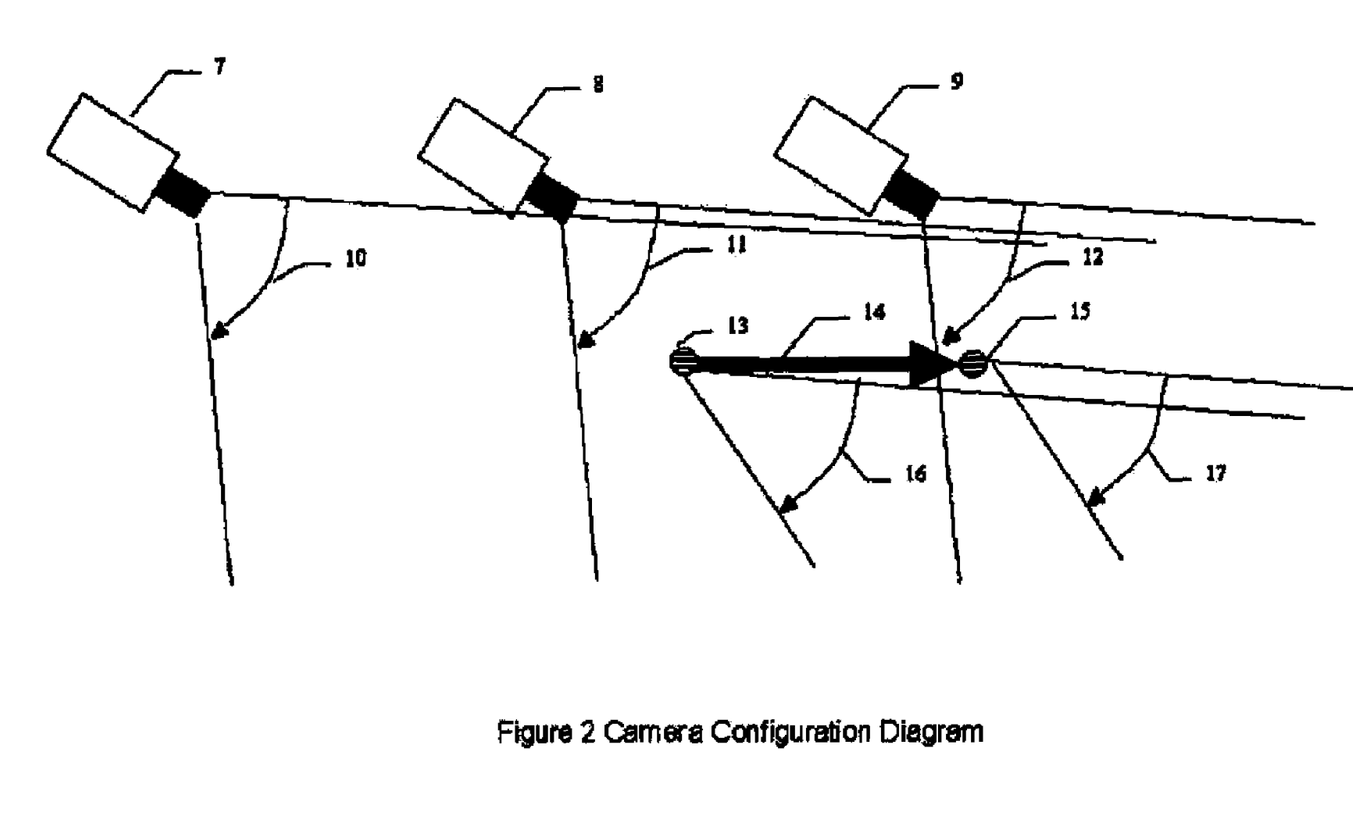
FIG. 2 is a block diagram showing a preferred orientation of three or more cameras employed in the present invention.

Cameras must be oriented so that at least views from pairs of cameras overlap each other. For instance, as depicted in FIG. 2, camera 7 may be positioned to have a desired view angle 10 with respect to a short sequence 14 of viewpoints. The short sequence 14 of viewpoints is defined by a beginning viewpoint 13 with view angle 16 and an ending viewpoint 15 with view angle 17. All viewpoints along the short sequence may be described as a view from a synthetic viewpoint.

Accordingly, camera 8 is positioned to have a view angle 11, which overlaps in coverage with respect to the view of camera 7 with view angle 10. Furthermore, the pair of cameras 7,8 have views that substantially contain the viewpoint sequence 14. In a substantially similar way, camera 9 is positioned to have a view angle 12, which overlaps in coverage with camera 8 and with respect to other short sequences of viewpoints (not depicted) captured by camera 8, and so on.

In this respect, the cameras 7, 8, 9 depicted in FIG. 2 are oriented so that at least pairs of cameras (e.g. cameras 7, 8 or cameras 8, 9) have similar views, per view angles 10, 11, 12 into a scene and provide parallax information sufficient to produce relative image displacements sufficient for subsequent image and/or correspondence processing.

The above-mentioned example is provided to assist in the understanding of the present invention and is not meant to impose limitations on the range of applications or usefulness of the invention.

In another embodiment, with respect to FIG. 2, placement of the cameras 7, 8, 9 may be sufficiently dense to be consistent with the objectives of having temporally short sequences (e.g. a fraction to a few seconds long) at a required or desired pace or velocity.

For instance, if the desired application parameters require simulation of person walking at a leisurely pace, then the configuration density of cameras 7, 8, 9 to capture a person walking at a pace of 1.5 meters per second, is to locate one camera every three meters in order to have a two-second short sequence length. Therefore, the camera density objective here is to place one or more cameras at an average of one every three meters, and to set the short sequence length to two seconds. This placement equates average spatial short sequence lengths to average camera densities.

Similar calculations may be applied to determine the number of cameras having different lens magnification, which is required to capture zooming short sequences effectively. In a similar manner, one can determine a configuration of cameras that may point outward at various angles in a manner necessary to make panning effective. In the cases of zooming and panning, very little or no parallax information is needed and therefore, camera sets that are used for these short segments are preferably co-located.

For example, in viewing a street, where the objective is image coverage of sidewalks on both sides of the street, both sidewalks may be imaged for a walking pace at a density of about 1,000 cameras for 250 meters of street length. In this configuration, approximately every three meters (along both sidewalks) a group of 6 cameras is placed. Greater or lesser densities may be used, depending on the amount of visual obstruction in the area, the likelihood that events of interest will occur that attract users, and the availability of permission or ability to secure cameras.

Again, this example is provided for instruction and is not intended to limit the range of applications or usefulness of the invention.

Referring now to FIG. 3, there is shown a repetitive short sequence means 19, which comprises a set of processes, each of which takes as input some small set of nearby camera outputs, and which generates a set of images as though they were generated from a set of novel viewpoints. These viewpoints fall along some predetermined line, or pan across some predetermined arc, or zoom through some predetermined range.

For instance, the camera arrangement depicted in FIG. 2 facilitates generation of a set of viewpoints along a purely linear, translational motion, where the view direction at beginning viewpoint 13 is essentially the same as the view direction from ending viewpoint 15. Ending viewpoint 15 and beginning viewpoint 13 are not those of existing cameras, but are rather synthetic viewpoints.

Referring back to FIG. 3, the repetitive short sequence means 19 provides a continuous set of repetitive short sequences wherein all short sequences occupy the exact same amount of time and, therefore, contain the same number of frames of image data.

Preferably, substantially all short sequences of virtual viewpoints are produced simultaneously and in lock step. The length of time for each short sequence is determined by a combination of application requirements, camera placement and processing availability. A discussion of performance tradeoffs is presented below.

Each short sequence consists of a predetermined set of spatial coordinates and virtual camera parameters that may, in general, constitute a set of viewpoints along some trajectory and with some constant or changing view direction, magnification and rotation about the optical axis. This short sequence may, for example, consist of a straight line of equally spaced viewpoints all having parallel optical axes and identical magnification. Such a linear configuration of the viewpoints creates effective motion of constant velocity. Or, in another example, the viewpoints may follow a curve or rotate about a point, essentially providing a panning view. Alternatively, the viewpoints may keep identical optical axis and change magnification, essentially providing a zoom effect.

It is also possible for a short sequence to simply constitute an unmoving sequence of identical viewpoints, which provides a view as though a viewer is stationary. Although any combination of viewpoints is possible for a specific predetermined short sequence, it is most likely that the sequence would simulate some smooth motion as would be appreciated by a viewer.

Furthermore, each short sequence, save the beginning and last in each terminal of a long sequence, has a synthetic viewpoint beginning at or very near the same location as the end of at least one other sequence, and perhaps the ends of more than one other sequence. Such beginnings and endings are called "Junctures". Additionally, because it is convenient to place clusters of cameras together, it is likely in many applications that several short sequences will participate in each such juncture. Also, it is advantageous that viewpoints at or near Junctures share common view directions and magnifications, etc. so as to allow smooth visual transitions between predetermined short sequences.

In some circumstances, it is advantageous to have some sequences longer than most or longer than others. For simplicity, the sequences in the preferred embodiment are constrained to lengths that are integer multiples of the common short sequence length. By so doing, the junctures at the beginning and end of longer as well as normal short sequences are all processed at the same instant. The constraint that such a longer short sequence places on the user experience is that, when viewing this particular portion of the virtual path, the command to change virtual paths is delayed by some integer multiple of the normal response delay to the user commands.

Figure 4:
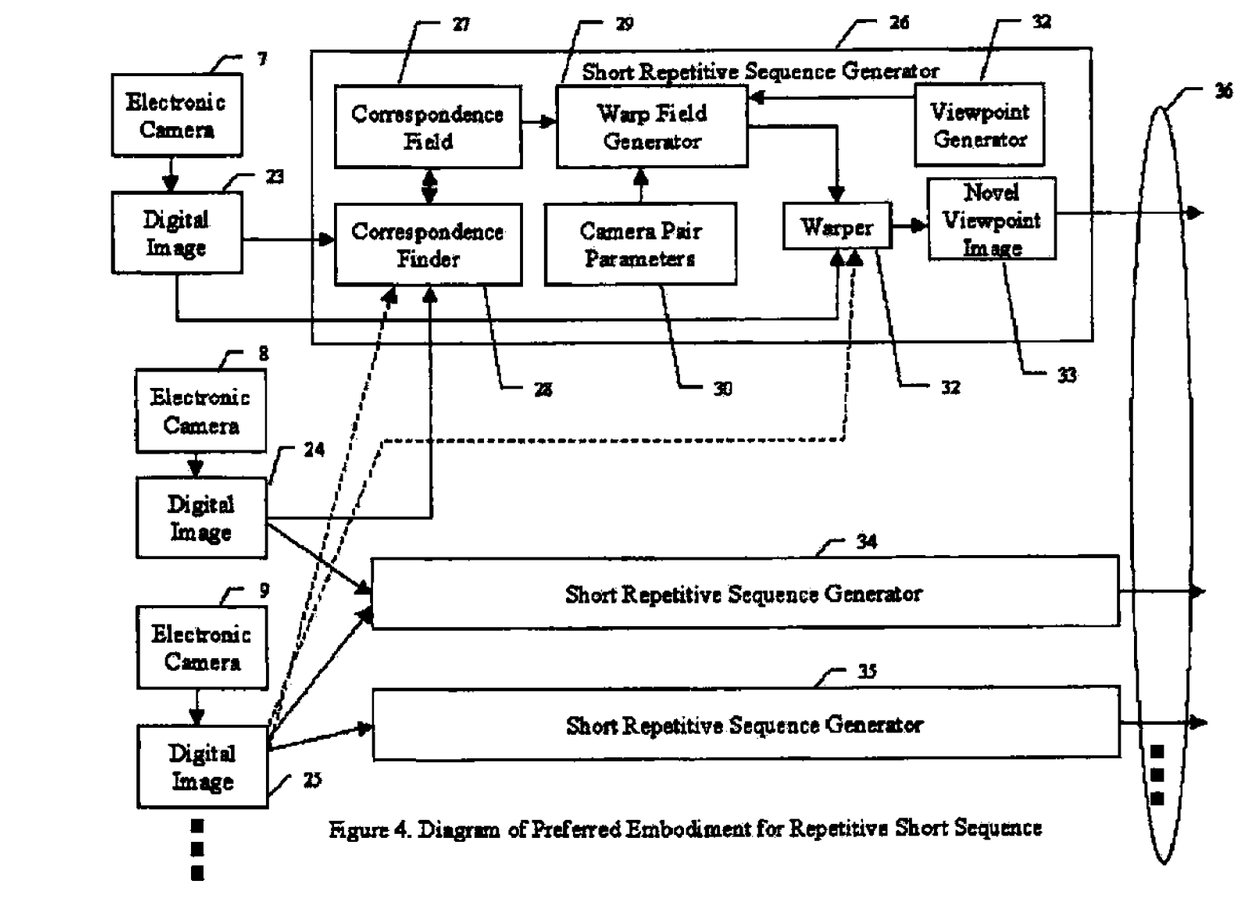
FIG. 4 is a block diagram of a preferred embodiment of a repetitive short sequence device employed in the present invention.

The mechanics by which short sequence digital video data are produced are shown in FIG. 4 as a sequence video generator 26, 34, 35 and so on. Each generator operates in substantially the same way.

Generally, in operation, at least two cameras 7, 8 produce images that are delivered to one generator 26. Alternatively, more than two camera sources may be connected to a single sequence video generator such as image 25 is delivered to generator 26. Generator 26 provides an output 33 in synchronization with all other such outputs 36 so that all sequences begin at the same instant and end at the same instant. Note that those short sequences that are by design longer than the majority of short sequences do not participate in all begin/end instants.

More specifically, operation of the sequence video generator 26 is the mechanism by which continuing real electronic images from cameras that view adjacent and overlapping portions of the scene are used to produce a short and repetitive view sequence.

Generator 26 comprises several component processes and data. Many types of processing steps may be used to implement synthetic viewpoint image generation. One example is shown herein where a correspondence finder 26 initiates or updates an existing correspondence field 27. This correspondence field, along with camera parameters 30 and a viewpoint from the viewpoint generator 32 are used by a warp field generator 29 to produce a warp field. A warper 32, warps the image from one of the cameras 23 (suitably delayed to be brought into temporal registration with the warp field data). The viewpoint sequencer 32 provides the specific viewpoint needed for the specific instant.

The warper 32 produces a synthetic viewpoint image 33. All of these processes are ongoing and continuing so that there is no significant temporal jitter or ongoing accumulated delay. Other images, such as 25, may be used in the process of determining pixel values for some portions of the image.

Figure 5:
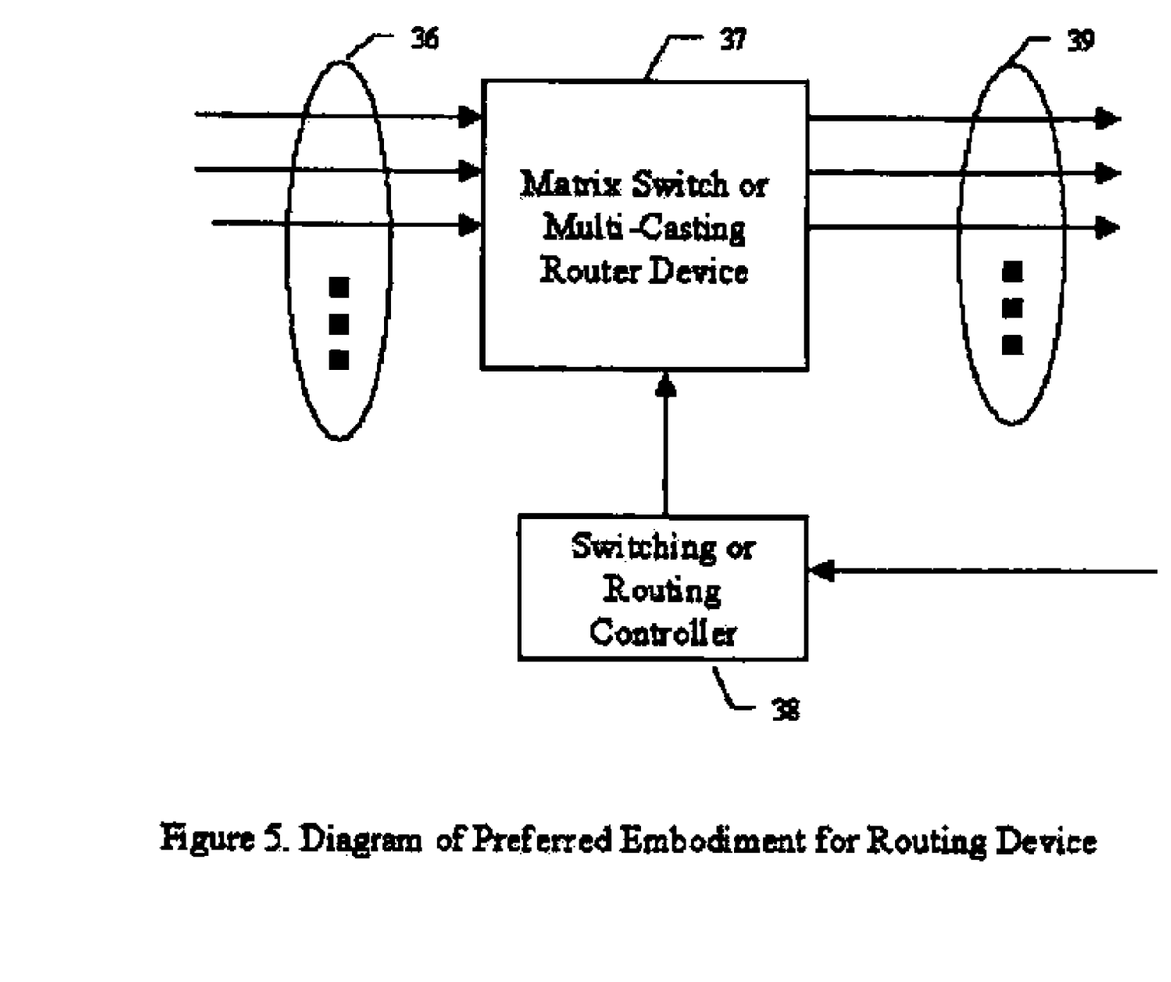
FIG. 5 is a block diagram of a preferred embodiment of a routing device employed in the present invention.

Referring now back to FIG. 5, there is shown a routing means 20, which provides a way to connect large numbers of digital data of short sequences to user service processes. The routing means 20 may be a digital packet switch or matrix switch or any other such technology capable of interconnecting thousands of channels of data to thousands of receiving processors.

The routing means 20 is capable of multi-casting; that is, sending the same data source to more than one recipient. The routing means 20 is provided with updates as frequently as the short sequence repetition rate, and a small fraction of connections may be changed during each sequence time period.

Referring now to FIG. 5, the routing means consists of a packet router or matrix switch 37, which is responsible for directing short sequence digital video data 36 to various data streams of digital video 39 that serve appropriate user service processes. The router or switch 37 is a data packet router or matrix switch, or may comprise any other like electronic or software means that is capable of handling large volumes of data.

Mapping is a one-to-many process in that any input, such as data 36, may map to any single or plurality of outputs, as at 39. However, each output, at any instant, is sourced from one input only.

A subsequent process or device, as in 38, provides controlling commands so that the router/switch may function. The controlling commands update mapping at a frequency of once per short sequence time. Furthermore, this update may be limited by the capacity of the data packet router or matrix switch 37 to perform such changes. Generally, such changes in a map will be on the order of no more than ten percent of the connections per short sequence time.

For example, in situations where there are 1,000 sources of input data 36, 1,000 destinations of output 39, and a sequence length of two seconds, then the controller 38 performs the updating function every two seconds with no more than 100 connection changes.

Note that the present invention is not limited to the above example numbers. Greater numbers of data channels and shorter sequences may be applicable, and more powerful routers/switches may be employed to handle larger numbers of data connections and larger percentage and frequencies of map changes than described in the example.

Figure 6:
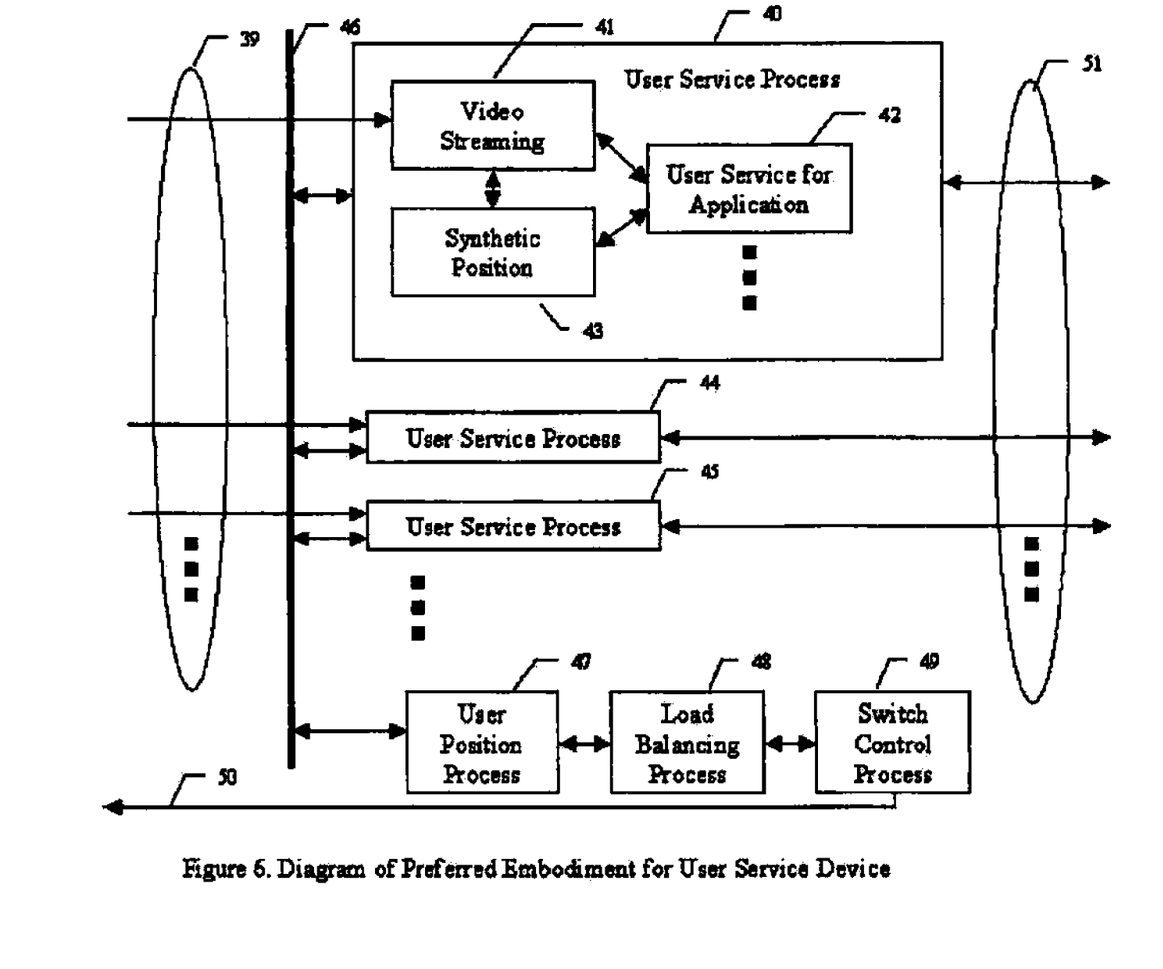
FIG. 6 is a block diagram of a preferred embodiment of a user service device employed in the present invention.

Referring now to FIG. 6, there is shown the user service means 4, which comprises one or more processors 40, 44, 45 responsible for servicing the needs of each individual user. Only three sub processors are shown for clarity. There may be very many such processors in a particular embodiment of the present invention. Each processor 40, 44, 45 is capable of supporting some small number of users, such as ten. The number of users per processor 40, 44, 45 is capable of increasing as performance of processors increases.

Each processor 40, 44, 45 provides at least one single visual telepresence. Therefore, a plurality of processors such as thousands of user service processors, is capable of supporting thousands of telepresences. When any specific user desires a change of virtual path, that user process is moved to a processor with sufficient capacity that is servicing the requested virtual path.

The user service means also comprises a user service load-balancing processes 47 and 48, which are configured to switch user processes to the appropriate processor, and to direct the routing of data.

By way of operation, each processor 40, 44, 45 receives a stream of digital visual data 39 from the switching means composed of short path sequences. These data may be composed into a continuous path through the scene. The data 39 are assembled into a continuous stream in a process called video streaming 41, and this stream is delivered over the network to the user via a network or the Internet 50.

The user service application process 42 provides interfaces between the user and any application that might provide other services to the user. It also includes features for control of virtual motion. When a user desires a virtual motion to change, the synthetic position processor 43 coordinates with the user position processor 47, over a local network 46. For instance, if the user wishes to turn or stop, controls on the user graphical interface (such as a web browser) may be activated. In response, the synthetic position processor 43 communicates with the user position process 47, and an appropriate user service process 44, 45, etc. wherein the next desired short sequence is being streamed is selected. The specific user application process is then moved to that user service process via commands over the local area network 46.

The user service load-balancing process 48 balances the load across the various user service processors 40, 44, 45 etc. The load balancing process 48 communicates with a user position processor 47 and a switch control process 49. When the user desires a change of virtual motion, the load balancing process determines whether the targeted processor for the specific user process which contains the desired virtual short sequence has the capacity to accept the additional load of that specific user process. If it does not, then another processor is assigned. Such assignment also requires an update of the router commands as indicated by connection 50.

The method of the present invention may be implemented with existing hardware and/or software. Factors that affect efficient performance of the present method include: 1) the number of short sequences, 2) the length of short sequences, 3) the number of cameras, 4) the switch, 5) the number of user processors, and 6) the number of users.

A primary feature and advantage of the present invention is the efficient presentation of visual telepresence with virtual motion to many users. The primary means by which this is accomplished is by providing a large but finite set of predetermined short sequences that are then joined together to fulfill the desire of the user to navigate. This ability to navigate is constrained to only those paths that are predetermined.

Therefore, both the quantity and the shortness of short sequences contribute to the flexibility of user navigation.

The most flexible performance of the present method involves having every possible view throughout a space to be captured to be simultaneously synthesized, thereby bringing the short sequence length to one. In such a situation, the user has substantially total navigational control.

As computational systems become more powerful, it is conceivable that such a system may be constructed, even though there may be the need for millions or billions of such viewpoints. Furthermore, more and shorter sequences are likely to require more cameras to be placed in the environment. It is convenient but not necessary to have approximately one camera per short sequence on average.

In terms of computational capabilities, one pair of cameras may be processed to produce one short sequence by one high performance computer with one attached specialized image processor with warping capability, producing images of the order of 320×240 resolution at 15 frames per second, circa 2002. For the 250-meter, two-sidewalk street example, delivery of a virtual telepresence requires approximately 1,000 such processors for image processing.

When image data processing capabilities allow for higher capacities one should consider whether to increase frame rates or resolution rather than to produce more and shorter sequences. This is a matter of the requirements of the application. Some applications may benefit from greater frame rates and resolution, while others may benefit from greater flexibility in navigation, and hence, more and shorter sequences.

Any increase in the number of short sequences being processed also increases the demand on the switch/router. If the number of virtual telepresences increases, then the number of user service processes also increases. Both of these increases, in turn, tend to increase the number of channels of data to be handled by the switch/router.

Regarding the user service process and processors, existing computer systems may provide one channel of video streaming, and also support about ten users. It is possible that with increased computational power, the number of video streams may be increased, or the number of users increased, or both. If the number of video streams is increased, the incoming channels of digital image data must increase accordingly.

The above description and drawings are only illustrative of preferred embodiments that achieve the objects, features and advantages of the present invention, and it is not intended that the present invention be limited thereto. Any modification of the present invention that comes within the spirit and scope thereof is considered to be part of the present invention.

The invention claimed is:

1. A method for virtually navigating an environment in three dimensions, the method comprising:
   defining virtual paths in the environment;
   capturing images of the environment from a plurality of cameras;
   receiving a navigation request;
   generating a plurality of synthetic images corresponding to viewpoints along the previously defined virtual paths; and
   transmitting a sequence of synthetic images corresponding to viewpoints along the virtual path that most closely matches the navigation request,
   wherein at least one of the synthetic images has a perspective different than any of the plurality of cameras.

2. The method of claim 1, wherein positions of the virtual paths and viewpoints are based at least in part on positions of the cameras.

3. The method of claim 1, wherein the defining step is performed once and the capturing, receiving, generating, and transmitting steps are performed repeatedly.

4. A method for efficiently providing a virtual presence within a three-dimensional scene to a plurality of simultaneous users, the method comprising:
   defining a plurality of virtual paths within the scene, each path terminating at a junction;
   defining a plurality of viewpoints along each virtual path;
   capturing real-time images of the scene from a plurality of cameras;
   generating a synthetic image corresponding to each viewpoint based on the captured real-time images;
   combining synthetic images corresponding to the plurality of viewpoints along a predefined virtual path to produce a sequence of images;
   receiving a navigation request from at least one user of the plurality of simultaneous users;
   selecting a predefined virtual path of the plurality of virtual paths based on the navigation request; and
   transmitting the sequence of images along the selected virtual path to the at least one user,
   wherein at least one of the synthetic images has an optical axis different than any of the plurality of cameras.

5. The method of claim 4, wherein each sequence of images begins with an image from a viewpoint at a first junction and ends with an image from a viewpoint at a second junction.

6. The method of claim 4, further comprising queuing a second navigation request received from the at least one user while a sequence of images is being transmitted to the at least one user.

7. The method of claim 4, wherein the plurality of cameras comprises pairs of cameras, each pair having at least partially overlapping views and similar viewing angles.

8. The method of claim 4, wherein the plurality of cameras comprises cameras arranged substantially parallel to the virtual paths.

9. The method of claim 4, wherein clusters of at least some of the plurality of cameras are located near junctions.

10. The method of claim 4, wherein the plurality of simultaneous users comprises at least one thousand users.

11. A system for efficiently providing a virtual presence within a three-dimensional scene, the system comprising:
   a plurality of cameras comprising pairs of cameras, each pair configured to capture at least partially overlapping real-time views of at least a portion of the scene at similar viewing angles;
   at least one image processor configured to generate synthetic images corresponding to viewpoints along predefined virtual paths within the scene based on at least two real-time views and combine the images into sequences of images;
   at least one router configured to select sequences that best match respective navigation requests;
   at least one processor configured to compose a video stream comprising at least one sequence selected by the router; and
   a plurality of displays coupled to at least one processor via a data network and configured to display a respective composed video stream,
   wherein at least one of the synthetic images is from a perspective different than any of the plurality of cameras.

12. The system of claim 11, wherein at least some of the sequences of images comprise synthetic images corresponding to the viewpoints along two or more virtual paths sharing at least one common junction.

13. The system of claim 11, wherein the at least one processor comprises at least two processors and the system further comprises a load balancer configured to balance a load among the at least two processors.

14. The system of claim 11, wherein the displays are further configured to transmit navigation requests.

15. The system of claim 11, wherein at least one of the displays is a personal computer.

16. The system of claim 11, wherein the data network is the Internet.

17. The system of claim 11, wherein the system is configured to provide a virtual presence to more simultaneous users than the number of processors.

18. The method of claim 1, wherein the at least one of the synthetic images has an optical axis different than any of the plurality of cameras.

19. The method of claim 4, wherein the at least one of the synthetic images has an optical axis parallel to an optical axis of at least one of the plurality of cameras.

20. The method of claim 4, wherein the at least one of the synthetic images is from a perspective different than any of the plurality of cameras.

21. The system of claim 11, wherein the at least one of the synthetic images has an optical axis different than any of the plurality of cameras.

* * * * *

UNITED STATES PATENT AND TRADEMARK OFFICE
CERTIFICATE OF CORRECTION

| | | |
|---|---|---|
| PATENT NO. | : 7,631,261 B2 | Page 1 of 1 |
| APPLICATION NO. | : 10/660747 | |
| DATED | : December 8, 2009 | |
| INVENTOR(S) | : Thomas D. Williams et al. | |

It is certified that error appears in the above-identified patent and that said Letters Patent is hereby corrected as shown below:

Title Page;

On page 1, Column 1, under Assignee, please delete "Inoue Technologies, LLC" and insert -- Inoe Technologies, LLC --.

(*) Notice: should read, Subject to any disclaimer, the term of this patent is extended or adjusted under 35 U.S.C. 154 (b) by 1037 days.

Signed and Sealed this

Thirty-first Day of August, 2010

David J. Kappos
*Director of the United States Patent and Trademark Office*